United States Patent Office 2,971,963
Patented Feb. 14, 1961

2,971,963
PROCESS FOR THE PREPARATION OF HALOGENATED 3-KETO-STEROIDS

Willem Jacob van der Burg, Oss, Netherlands, assignor to Organon Inc., West Orange, N.J., a corporation of New Jersey No Drawing. Filed Mar. 16, 1959, Ser. No. 799,448

Claims priority, application Netherlands Apr. 28, 1958

4 Claims. (Cl. 260—397.3)

The invention relates to a novel, industrially important process for the preparation of 3-keto-steroids which in the α-position relatively to the 3-keto group have a chlorine or a bromine atom by simultaneously oxidizing and halogenating a 3-hydroxy steroid compound, or halogenating a 3-keto-steroid compound.

A large number of 3-keto-steroids are known that have a double bond in 1,2 and/or 4,5 position. Of this group of steroids especially the $\Delta^4$-3-keto and $\Delta^{1,4}$-3-keto-steroids are of great importance, because a large number of these compounds have biological activity. Other compounds of this group, such as the $\Delta^1$-3-keto-steroids and some $\Delta^{1,4}$-3-keto-steroids, for example $\Delta^{1,4}$-3,17-diketo-androstadiene, are important as intermediate products for the preparation of biologically active compounds.

The introduction of one or both double bonds into 1,2 and 4,5-position is in most of the cases effected in the last part of the synthesis of the desired compounds.

This may take place by using as a starting material a 3-hydroxy-steroid saturated in ring A, oxidizing this to the corresponding 3-keto compound by means of an oxidizing agent, such as chromic acid or N-bromosuccinimide, and subsequently introducing a halogen atom in 2 and/or 4-position. The introduction of a halogen atom in 2 or 4-position is dependent on the configuration of the steroid at the carbon atom 5. If for example bromine is reacted with a 3-keto-steroid of the allo series a 2-bromine derivative will be obtained in the first instance, whereas a 4-bromine derivative will be formed when use is made of a similar compound of the normal series.

The thus obtained mono or dihalogen 3-keto-steroids can be converted into the corresponding $\Delta^1$, $\Delta^4$, or $\Delta^{1,4}$-3-keto-steroids by treatment with a dehydrohalogenating agent.

For example, such a process for the conversion of 3α-hydroxy-20-keto-pregnane into $\Delta^4$-3,20-diketo-pregnene has been described in J. Biol. Chem. 184, page 393 (1950), by B. A. Koechlin et al.

From British Patent 760,362 it is known that the oxidation of the 3-hydroxyl group to a 3-keto group and the bromination in the α-position relatively to this keto group can also be carried out simultaneously by reacting a 3-hydroxy-steroid compound with a N-bromoimide, N-bromoamide or N-bromohydantoin in the presence of an oxidizable alcohol. If in this process a 3-keto-steroid is used as a starting material likewise a 3-keto-steroid is obtained brominated in the α-position.

From United States Patent 2,714,600 it is known that 3-hydroxy-steroids can be convetred into the corresponding α-chlorinated 3-keto-steroids by means of an alkyl hypochlorite, for example tertiary-butyl hypochlorite. Starting from a steroid compound of the allo series a 2-chloro compound is obtained, whereas a steroid compound of the normal series yields a 4-chloro compound.

A new process has now been found for the preparation of 3-keto-steroids chlorinated or brominated in the α-position, characterized in that a 3-hydroxy or 3-keto-steroid compound is reacted with chloric acid or bromic acid.

Thus according to the process of the invention it is possible to convert a 3-hydroxy-steroid compound into the 3-keto-steroid chlorinated or brominated in the α-position by means of chloric or bromic acid by a simultaneous oxidation and halogenation. The same final products are obtained when starting from a 3-keto-steroid.

The present halogenation reaction follows the general rule, that starting from a steroid of the normal series in the first instance halogen is introduced in 4-position and starting from a steroid of the allo series in 2-position. By further halogenation the 2,4-dihalogen steroids can then be obtained which can be converted into the corresponding important $\Delta^{1,4}$-3-keto-steroids by splitting off of hydrohalide.

In regard to the known methods in which an organic N-bromine derivative of an organic hypochlorite is applied for the simultaneous oxidation and halogenation, the present process has the advantage that considerably higher yields of α-halogenated 3-keto-steroids are obtained. The 3α,17α,21-trihydroxy-11,20-diketo-pregnane-21-acetate for example is converted into the 3,11,20-triketo-17a,21-dihydroxy-4-bromo-pregnane-21-acetate by means of bromic acid with a yield of about 90%.

As starting products for the process according to the invention 3-hydroxy and 3-keto-steroids can in general be applied. These steroids may have all kinds of substituents in positions outside ring A, such as free or functionally converted hydroxyl and keto groups, halogen atoms, lower alkyl groups and double bonds. The present process is of special importance for the application to 3-hydroxy and 3-keto-steroids of the pregnane and androstane series, because this application results in important biologically active final products, such as progesterone, cortisone, testosterone, and the like.

The chloric or bromic acid to be applied in the present process as active agent is preferably liberated in the reaction mixture by means of an acid from the salts of the acids in question, for example from the alkali metal chlorates or bromates.

The performance of the process may take place by dissolving the steroid compound to be applied as starting product in an organic solvent and adding to this solution an aqueous solution of chloric or bromic acid. Instead of the aqueous solution of chloric or bromic acid use is preferably made of a mixture of a chlorate or bromate and a quantity of acid that is capable of liberating the desired chloric or bromic acid from the used salt.

As solvents for the steroid compound there may be employed dioxane, tertrahydrofurane, an aliphatic ether, such as methyl ethylether and diethylether, a tertiary alcohol, such as t-butanol, or a substituted acid amide, such as dimethyl formamide and dimethyl acetamide.

Starting from 3-hydroxy steroids good yields of the corresponding halogenated 3-keto-steroids are obtained when applying a molar ratio of steroid to chloric or bromic acid ranging between 1:2.5 and 1:4. For 3-keto-steroids this ratio lies between 1:1.5 and 1:3.

The reaction time and the reaction temperature vary between wide limits. In most of the cases the reaction will be completed within 2 to 3.5 hours. The reaction is preferably carried out at a temperature between 0° and 40° C.

The following examples illustrate the invention.

Example I

To a solution of 2 g. of 3,17-diketo-androstane in 20 ml. of dioxane are added 3 g. of potassium bromate.

While maintaining the temperature of the mixture below 45° C. by cooling with ice-water, a mixture of 2 ml. of water and 1 ml. of concentrated sulphuric acid is added dropwise while stirring intensively. Then stirring is continued for another 4 hours at room temperature. Subsequently the reaction mixture is poured into 400 ml. of water, after which 100 ml. of a sodium sulphite solution in water is added to the aqueous mixture.

The precipitated 2-bromo-3,17-diketo-androstane is vacuum filtered and washed with water and finally dried in vacuo. Yield 2.45 g., melting-point 180–190° C. By crystallization from acetone about 2 g. of pure product are obtained herefrom or 80% of the theoretically possible yield.

*Example II*

5 g. of 17α,21-dihydroxy-3,11,20-triketo-pregnane-21-acetate are dissolved in 25 ml. of dimethyl acetamide. 6.8 g. of sodium bromate are added to this solution and then, while stirring slowly, a mixture of 5 ml. of water and 2.5 ml. of concentrated sulphuric acid. After stirring for 8 hours at room temperature the reaction mixture is poured into a solution of 10 g. of sodium acetate in 500 ml. of water. After stirring for 30 minutes the precipitated 4 - bromo - 17α,21 - dihydroxy - 3,11,20-triketo-pregnane-21-acetate is vacuum filtered, washed with water and dried in vacuo. Obtained are 5.82 g. of the 4-bromide in question. By crystallization from acetone-petroleum ether 5.53 g. of pure substance are obtained, or 92.5% of the theoretical yield, $[\alpha]_D = +110°$ (in acetone).

*Example III*

To a solution of 0.5 g. of 3,17-diketo-etiocholane in 4 ml. of dioxane is added a solution of 0.85 g. of bromic acid in 5 ml. of water. The mixture is stirred vigorously for 5 hours. The process of the reaction mixture is carried out as described in Example I. Obtained is 0.51 g. of 4-bromo-3,17-diketo-etiocholane of melting-point 192–194° C. (decomposition).

*Example IV*

1 g. of 3,17-diketo-androstane is dissolved in 10 ml. of dioxane, after which to this solution 2 g. of potassium chlorate are added and then, while stirring very vigorously, 3 ml. of 35% sulphuric acid. The reaction mixture is stirred vigorously for 7 hours at a temperature of 40° C., after which the mixture is processed as described in Example I.

The yield is 0.95 g. of 2-chloro-3,17-diketo-androstane of melting-point 211–213° C.

*Example V*

To a solution of 5 g. of allo-dihydrocortisone-21-acetate in 30 ml. of tetrahydrofurane are added, while cooling, 7 g. of potassium bromate and a mixture of 5 ml. of water and 2.4 ml. of concentrated sulphuric acid. After stirring at −20° C. for 12 hours the reaction mixture is poured into a solution of 10 g. of sodium acetate in 100 ml. of water. The processing of this mixture is carried out according to the process described in Example II. Obtained are 5.44 g. of 2-bromo-allo-dihydrocortisone-21-acetate, or 91% of the theoretical yield. Melting-point 183–187° C. (decomposition).

*Example VI*

10 g. of 3α,17α,21-trihydroxy-11,20-diketo-pregnane-21-acetate in 100 ml. of dioxane and 15 g. of sodium bromate are stirred very intensively while cooling in an ice-bath, while during 15 minutes a mixture of 5.5 ml. of concentrated sulphuric acid and 10 ml. of water is added dropwise. The temperature is kept below 25° C. Then stirring is continued for another 6 hours at room temperature. The processing of the reaction mixture is carried out as described in Example II.

Obtained are 10.8 g. of pure 4-bromo-3,11,20-triketo-17α,21-dihydroxy-pregnane-21-acetate, or 90° of the theoretical yield. Melting-point 203–206° C. (decomposition).

*Example VII*

1 g. of 4,5-dihydro-cortisone-21-acetate is dissolved in 10 ml. of dioxane, after which, while stirring, 1.5 g. of sodium chlorate, 1 ml. of water, and 0.5 ml. of concentrated sulphuric acid are added to this solution. The mixture is stirred vigorously for 8 hours at a temperature of 35° C. and then poured into a solution of 2 g. of sodium acetate in 100 ml. of water. Then the mixture is filtered and the precipitate washed and dried in vacuo. Obtained are 1.05 g. of 4-chloro-4,5-dihydro-cortisone-21-acetate of melting-point 226–229° C. (decomposition).

*Example VIII*

2 g. of 3β-hydroxy-17-keto-etiocholane are stirred intensively for 5 hours together with 4 g. of potassium bromate, 20 ml. of dioxane, 2 ml. of water, and 3.0 ml. of concentrated hydrochloric acid. The processing of the reaction mixture is carried out as described in Example I, as a result of which the 4-bromo-3,17-diketo-etiocholane is obtained in a yield of 2.36 g.

I claim:

1. Process for the preparation of a 3-keto-steroid which is mono-halogenated in the alpha-position relative to the 3-keto group, which comprises reacting a steroid selected from the group consisting of the ring A saturated steroids of the androstane and pregnane series having as the sole substituent in ring A a member selected from the group consisting of a 3-keto group and a 3-hydroxy group, with a halogenic acid selected from the group consisting of chloric acid and bromic acid, in the presence of an organic solvent and at a temperature below about 50° C.

2. The process of claim 1 in which the halogenic acid is formed in situ by the action of an acid on a salt selected from the group consisting of chlorates and bromates.

3. Process for the preparation of a 3-keto-steroid which is mono-halogenated in the alpha-position relative to the 3-keto group, which comprises reacting a steroid selected from the group consisting of the ring A saturated steroids of the androstane and pregnane series having as the sole substituent in ring A a 3-hydroxy group, with a halogenic acid selected from the group consisting of chloric acid and bromic acid, the molar ratio of the steroid to the halogenic acid ranging from about 1:2.5 to about 1:4, in the presence of an organic solvent and at a temperature below about 50° C.

4. Process for the preparation of a 3-keto-steroid which is mono-halogenated in the alpha-position relative to the 3-keto-group, which comprises reacting a steroid selected from the group consisting of the ring A saturated steroids of the androstane and pregnane series having as the sole substituent in ring A a 3-keto group, with a halogenic acid selected from the group consisting of chloric acid and bromic acid, the molar ratio of the steroid to the halogenic acid ranging from about 1:1.5 to about 1:3, in the presence of an organic solvent and at a temperature below about 50° C.

References Cited in the file of this patent

UNITED STATES PATENTS

| | | |
|---|---|---|
| 2,666,068 | Hanze et al. | Jan. 12, 1954 |
| 2,666,072 | Hanze et al. | Jan. 12, 1954 |
| 2,714,600 | Fonken et al. | Aug. 2, 1955 |

OTHER REFERENCES

Ehret: "Smith's College Chemistry" 6th edition (New York: D. Appleton-Century Co., Inc., 1947), pages 298, 299, 303, 305, and 306.